(12) United States Patent
Sinclair

(10) Patent No.: US 6,578,127 B1
(45) Date of Patent: *Jun. 10, 2003

(54) MEMORY DEVICES

(75) Inventor: Alan Welsh Sinclair, Edinburgh (GB)

(73) Assignee: Lexar Media, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,342

(22) Filed: Oct. 1, 1998

Related U.S. Application Data

(63) Continuation of application No. PCT/GB97/00934, filed on Apr. 2, 1997.

(30) Foreign Application Priority Data

Apr. 2, 1996 (GB) ................................................ 9606928

(51) Int. Cl.$^7$ .............................................. G06F 12/08
(52) U.S. Cl. ....................................... 711/202; 711/154
(58) Field of Search ................................ 711/103, 202, 711/209, 203, 170, 171, 5, 154; 365/185.09

(56) References Cited

U.S. PATENT DOCUMENTS

| | | | | |
|---|---|---|---|---|
| 4,145,745 A | * | 3/1979 | De Bijl et al. ................... 711/4 |
| 4,507,760 A | | 3/1985 | Fraser ......................... 365/221 |
| 5,202,799 A | * | 4/1993 | Hetzler et al. ................. 360/48 |
| 5,479,639 A | * | 12/1995 | Ewertz et al. ............... 711/103 |
| 5,648,929 A | | 7/1997 | Miyamoto ............. 365/185.04 |
| 5,740,396 A | * | 4/1998 | Mason ........................ 711/103 |
| 5,765,193 A | * | 6/1998 | Rosich et al. ................ 711/136 |
| 5,765,206 A | * | 6/1998 | Hohensee et al. ........... 711/203 |
| 5,819,307 A | * | 10/1998 | Iwamoto et al. ............. 711/103 |
| 5,822,781 A | * | 10/1998 | Wells et al. ................. 711/171 |
| 5,907,716 A | * | 5/1999 | Yoshimura .................... 710/54 |
| 6,046,937 A | * | 4/2000 | Komori et al. ......... 365/185.04 |
| 6,078,520 A | * | 6/2000 | Tobita et al. .......... 365/185.09 |
| 6,272,610 B1 | * | 8/2001 | Katayama et al. .......... 711/171 |

FOREIGN PATENT DOCUMENTS

| | | |
|---|---|---|
| EP | 615 184 A2 | 9/1994 |
| GB | 2 291 991 A | 2/1996 |

* cited by examiner

*Primary Examiner*—Matthew Kim
*Assistant Examiner*—Pierre-Michel Bataille
(74) *Attorney, Agent, or Firm*—Law Offices of Imam

(57) ABSTRACT

A computer system has a memory device. The memory device includes a user interface, a controller, a store, and an address mapping device for mapping a first address from the user interface to a second address for accessing the store, where the controller stores information in successive regions of the store each time the information is updated.

8 Claims, 2 Drawing Sheets

MEMORY DEVICES

This application is a continuation of PCT/GB97/00934 filed Apr. 2, 1997.

BACKGROUND OF THE INVENTION

1. Field of the Invention

The present invention relates to memory devices. It finds particular application in the field of magnetic disk drive emulation.

2. Description of the Related Art

Non-volatile memories are frequently used in semiconductor applications because the store information without the need for power to be applied to the memory. In particular non-volatile memories are used as solid state storage devices for emulating magnetic disks.

European Patent Application No. 0615184A2 (IBM) shows a FLASH memory filing system which is protected against block and device failures by storing data in duplicate and using a redundancy area in each logical block in association with error correction codes. Cluster management information is stored in headers which are written in duplicate to two physical blocks. Included in this information is an erase counter to ensure that the physical limit for a block is not exceeded.

One type of non-volatile memory commonly used for disk drive emulation is FLASH EPROM FLASH EPROM has a number of peculiar characteristics. For example data can only be written to a location which has previously been erased. Individual locations cannot be erased, the memory must be bulk erased in units of an erasable block. Permanent failure of the cell may result from too many write/erase cycles. Typically, the total number of times that a location may be erased and written is limited to the range 100.000 to 1.000.000 cycles.

There are certain characteristics of solid state disk memories that use FLASH EPROM. The memory medium must be bulk erased in units of an erasable block which is normally greater than the size of a data block (also known as a sector). Since a cell of FLASH EPROM cannot be modified without an erase operation being performed first, rewriting of a sector must occur in a different physical location causing the contents of its previous location to become obsolete.

Data transferred to a memory system from a host is termed a logical sector and it corresponds to a logical address. This logical address is translated by the memory system to a physical address which addresses a physical location in the memory.

Sectors in the memory which contain valid data must be relocated from an erasable block before the block can be erased to recover memory space occupied by obsolete sectors. The physical location allocated to a logical sector address is variable that is a physical location will not always correspond to one particular logical address. Therefore the physical locations that correspond to the logical addresses must be stored in a lookup table or a similar device to record the logical to physical address mappings. The algorithms used for writing sector data to the memory medium and for erasing the memory medium must ensure uniform utilisation of the medium and elimination of any memory "hot-spots" and wear-out effects.

Information must be stored in a non-volatile memory to allow the control system for the solid state storage device which is emulating the magnetic disk to be correctly initialised after electrical power has been removed and then restored. This information (the control information) includes memory address pointers which must be known to reestablish correctly the algorithms for erasing or writing. Status information relating to execution of critical operations such as the relocation of blocks of data within the memory system is also included in the control information.

Storage of control information presents no problem for magnetic disks because a full directory for locating files and sectors on a disk can be located at a known physical location on the disk. Data within this directory can be modified and rewritten at the same physical location. A magnetic disk does not require bulk erasure of the storage medium before data can be written. Neither is there any hazard to the reliability of the disk by repeatedly writing and erasing the same location.

However storage of control information is a problem for non-byte erasable memory because the information must be in a physical location which can be located by the control system after electrical power has been removed and then restored. Control information cannot be updated in a fixed physical location without bulk erasure of the memory medium but the number of erase/write cycles which can be applied to control information at a fixed physical location is restricted by the limited endurance characteristics of the technology. The limited write/erase cycle endurance of FLASH EPROM technology is particularly acute.

Previous teaching is that the solution to the problem of having to modify the control information frequently on a block erasable memory lies in storing the control information in a different location each time it is written. This however has a number of serious problems associated with it. If power is unexpectedly lost because of a power cut or accidental removal of the memory from the host then the system would have no way of locating the control information necessary for operating the system because it would be stored in a random place.

SUMMARY OF THE INVENTION

The present invention is therefore concerned with repeatedly storing information in different locations in memory while ensuring that in the event of an unexpected power loss the said information can be recovered.

According to the present invention there is provided a memory device comprising a user interface a controller, a store, and address mapping means for mapping a first address from the user interface to a second address for accessing the store where the controller stores information in successive regions of the store each time the information is updated.

BRIEF DESCRIPTION OF THE SEVERAL VIEWS OF THE DRAWINGS

For a better understanding of the present invention and to show how the same may be carried into effect, reference will now be made, by way of example to the accompanying diagrams in which.

DETAILED DESCRIPTION OF THE INVENTION

Figure 1:
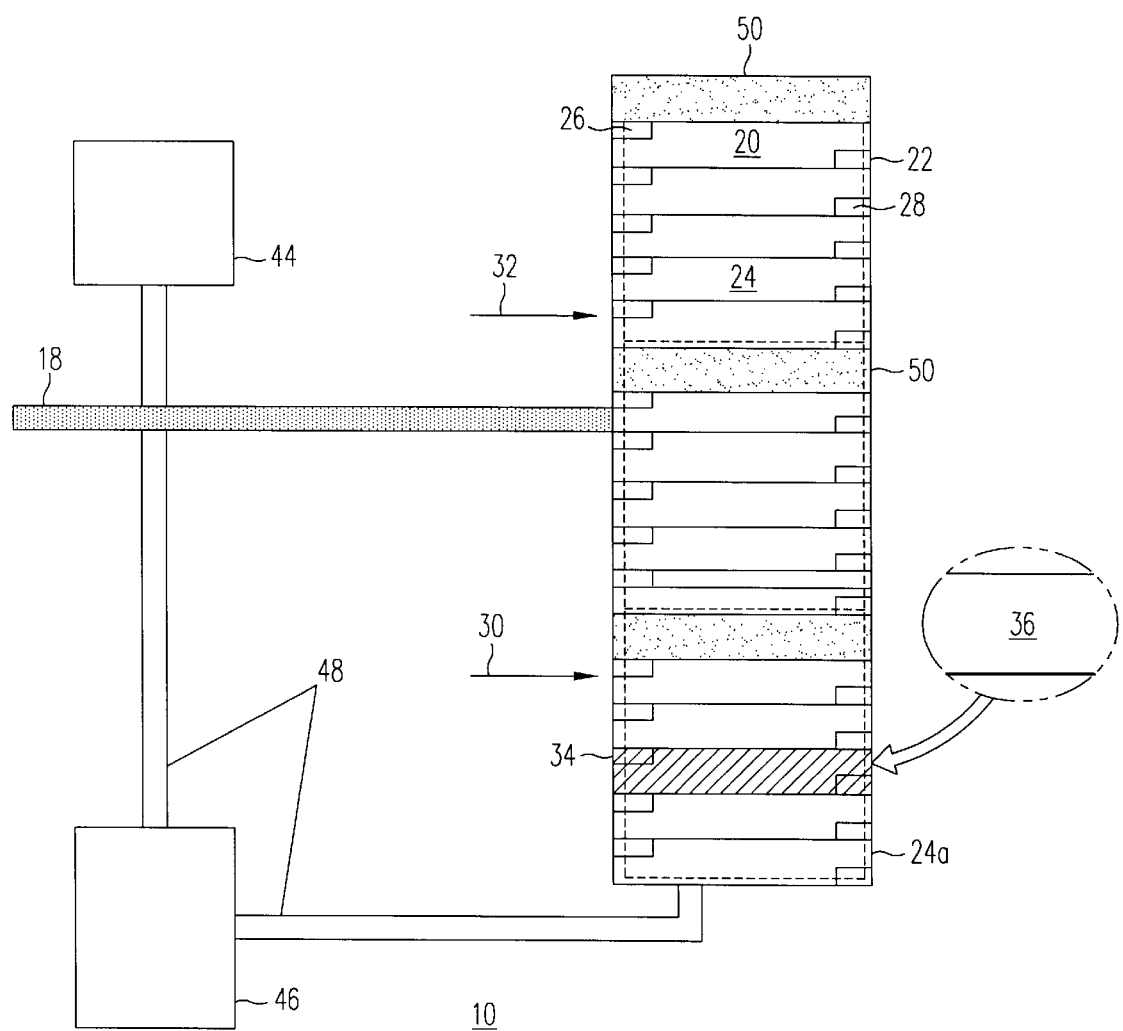
FIG. 1 shows a memory system based on the present invention.
Figure 2:
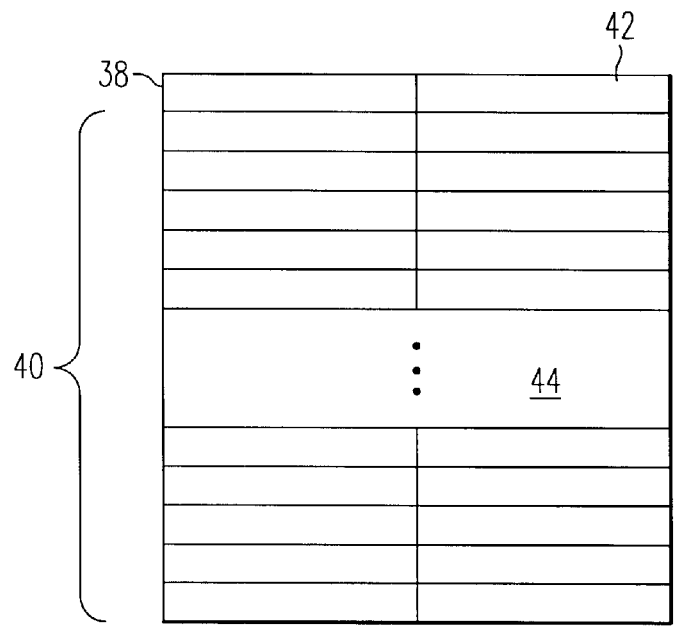
FIG. 2 shows a diagram of the logical to physical translation table associated with the FLASH memory.

Referring to FIG. 1, this shows a memory system 10 with a user interface 18 for transferring data between a host and a store. A FLASH memory device 20 is used as the main store. The memory system 10 emulates a solid state disk in a similar way to the system disclosed in UK patent application 9519670.5. FLASH storage devices are frequently used for magnetic disk emulation because the physical size of each storage cell is smaller than the physical size of an EEPROM cell.

The FLASH memory device 20 is composed of erase blocks 22. Each erase block 22 is the minimum erasable blocksize. Each erase block 22 is composed of a number of sectors 24. Data is read and written in units of one sector 24 (typically 512 bytes plus header information 26 and error correcting codes 28). Sectors 24 may be stored in the FLASH memory device 20 with a constant blocksize or may have a blocksize which is variable between sectors 24, such as would result if data compression were applied to the data. Sectors 24 are sometimes closely packed in the memory address space and their locations may not alien uniformly with the structure of the erase blocks 22 in the memory. The memory system 10 of the present embodiment has a write pointer 30 to point to the area of memory which is to be written to next and an erase pointer 32 to point to the area of memory which is to be erased next. Locations which lie between the write pointer 30 and the erase pointer 32 are in the erased state. Erase operations are scheduled to maintain a predetermined number of erased locations between the write pointer 30 and the erase pointer 32. Sectors 24 containing valid data which are located within an erase block 22 scheduled for erasure are first relocated one at a time to the location defined by the write pointer 30. The write pointer 30 and the erase pointer 32 are incremented after the write and erase operations respectively, and continuously cycle incrementally through the entire physical memory space. The erase/write algorithm automatically ensures the frequency of erasing and writing to the physical memory is equalised throughout the entire memory space.

The present invention could apply equally to any memory system which controls the cumulative number of erase/write cycles at a memory location.

In one embodiment of the present invention a single control sector 34 is used to record the control information 36 for the entire FLASH memory 20. The control information 36 contains the present location of the write pointer 30 the erase pointer 32 and additional status information which may vary depending on the particular application. The control information 36 is stored at a fixed location in logical address space rather than a fixed location in physical address space.

The control information 36 is stored at a location which cannot be accessed by the host. In this embodiment of the present invention the control information 36 is stored at the highest available logical address 38 and the host is only given an addressable range 40 from the lowest logical address up to the start of the control sector address. Thus the control information 36 is inaccessible by the host.

The control sector 34 has a fixed logical address but the physical location of the control sector 34 changes each time it is written. The current control sector physical address 42 is found by accessing the highest available logical address 38 in the logical to physical translation table 44 (which could be a lookup table).

The control sector physical address 42 is determined by an identical logical to physical address translation process to that used for data sectors 24 which are accessible by the host.

The control information 36 in the control sector 34 is rewritten regularly under the supervision of a controller 46 which controls the FLASH memory 20 and the logical to physical translation table 44 with control lines 48. The controller 46 ensures that every significant change in the control information 36 is rewritten.

The size of a control sector 34 containing control information 36 need not be the same as that of a sector 24 containing host data, but may be only as large as necessary to contain the control information 36. A control sector 34 contains header information 26 and error correcting codes 28 in identical format to those in a sector containing host data.

When any sector 24 is written to FLASH memory 20, its physical sector address location is defined by the current write pointer 30. The control sector physical address 42 (that is the logical to physical translation table entry for the control information's logical address) therefore contains the value of the write pointer 30 at the time the sector 24 containing the control information 36 was written. Therefore in some embodiments of this invention the value of the write pointer 30 may be derived from the control sector physical address 42 rather than being stored explicitly as a control information 36 entry. If the control information 36 is rewritten regularly then the physical sector address stored in the control information 36 is always slightly less than or equal to the current write pointer 30. Each sector 24 has a sector header which contains a write flag which is set when data is written to the sector 24. The value of the write pointer 30 can be determined during device initialisation by reading the control sector physical address 42 from the logical to physical translation table 44. Successive sector headers are then read starting from the control sector physical address 42 read from the logical to physical translation table 44 until the first header is found with the write flag cleared. The current write pointer 30 is this address of the first header with its write flag cleared. The control information 36 will be rewritten whenever the erase pointer 32 is incremented that is each time an erase block operation takes place. An erase block 22 is the minimum area that can be independently erased in the FLASH memory 20 and may contain a number of sectors 24 as shown in FIG. 1.

Where there is a large volume of control information 36 it may be beneficial to include multiple control sectors 34 in the system. Each of the multiple control sectors 34 would contain different parts of the control information 36 and each with a unique logical address which is inaccessible to the host.

Using multiple control sectors 34 minimises the amount of erased memory capacity which is consumed when control information 36 has to be rewritten following a chance in its contents. For example, in one embodiment of the above memory system 10 control information 36 is stored about each individual erasable block. It is necessary to define the address of the first sector 24_a_ within the erasable block 22 because sectors 24 are closely packed and do not align with the boundaries between erasable blocks 22. With the address of the first sector 24_a_ defined valid sectors can be located within the erase block 22 and relocated prior to an erase operation on the block 22. The address of the first sector 24_a_ can be marked by writing a unique control sector 34 as the first sector 24_a_ in each erasable block 22.

In the present embodiment the control information 36 for each erase block 22 is included in each block 22 as a block header 50. Each block header 50 is very small only containing enough bytes for essential information. The block headers 50 are all located in a logical address space which is not accessible by the host, but which is accessible by the controller 46. The highest available logical address 38 in this embodiment is a range of addresses, all of which are inaccessible by the host.

Figure 3:
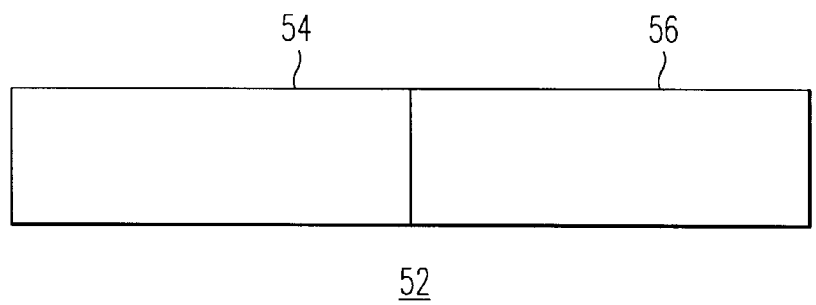
FIG. 3 shows the format of the logical address for each block header.
Figure 4:
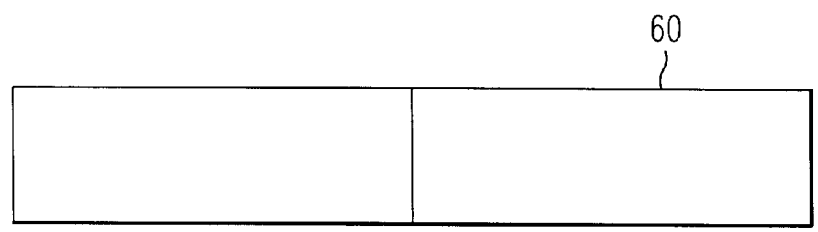
FIG. 4 shows the format of the pointer control sector.

Block headers 50 are located in FLASH memory 20 and are addressed by way of a logical to physical translation table 44 in the same way as any other sector 24. The logical address for each block header 50 is formed by a descriptor field 52 composed of two parts as shown in FIG. 3. The first part of the descriptor field 52 is a block header identifier 54 which is the same for each block header 50. The second part of the descriptor field 52 relates to the particular erase block number 56.

Other block headers 50 may also exist which contain different information and have different identifiers in their logical sector address. For example a pointer control sector 58 may exist for storing the value of the erase pointer 22. The pointer control sector 58 will be written immediately after an erase block 22 has been erased. The logical to physical translation table entry for the pointer control sector 58 contains a pointer physical address 60 which is the value of the write pointer 30 which existed at the time the pointer control sector 58 was written. The current value of the write pointer 30 will lie within a range of approximately one erase block 22 above this pointer physical address 60.

It will be appreciated that various modifications may be made to the above described embodiment within the ambit of the present invention. For example the store may be any block erasable memory, not merely a semiconductor memory.

What is claimed is:

1. A memory device for use with a host, the memory device comprising:
   a store including non-volatile memory and having physical address space;
   a user interface for transferring data from the host to the store;
   a controller for controlling said store;
   an address mapping device, controlled by the controller, for mapping a first address in logical address space from the user interface to a second address in physical address space for accessing the store,
   wherein the controller stores control information at a fixed location in logical address space, but in successive regions of the physical address space each time the information is updated.

2. A memory device according to claim 1 wherein the memory device includes a write pointer for pointing to an area of the store which is to be written next, and an erase pointer for pointing to an area of the store which is to be erased next, and
   wherein locations which lie between the write pointer and the erase pointer are in an erased state, and the write pointer and the erase pointer are incremented after write and erase operations respectively and continuously cycle incrementally through the entire physical address space in the store.

3. A memory device according to claim 2 wherein the control information includes the current positions of the write pointer and the erase pointer.

4. A memory device according to claim 1, 2 or 3, wherein logical addresses at which said control information is stored are barred from access by the host.

5. A memory device according to claim 4, wherein said control information is stored at the highest available logical address and the host is only given an addressable range from the lowest logical address up to, but not including, the highest available logical address.

6. A memory device according to claim 1, wherein said address mapping device maintains a constant address in logical address space for said control information.

7. A memory device, as recited in claim 1, wherein said store includes Flash memory.

8. A method for storing control information comprising:
   providing a store having physical address space;
   transferring data from a host to the store via a user interface;
   mapping a first address associated with the transferred data in logical address space to a second address in physical address space for accessing the store; and
   storing control information at a fixed location in logical address space, but in successive regions of the physical address space each time the information is updated.

* * * * *